United States Patent [19]

Yano et al.

[11] Patent Number: 5,555,233

[45] Date of Patent: Sep. 10, 1996

[54] DISK HOLD DEVICE HAVING AN OPERATION BUTTON

[75] Inventors: Hideo Yano; Susumu Arai, both of Saitama; Fumio Kobayashi, Nagano, all of Japan

[73] Assignees: Asahi Corporation, Tokyo; Kabushiki Kaisha Sankyo Seiki Seisakusho, Nagano, both of Japan

[21] Appl. No.: 136,888

[22] Filed: Oct. 18, 1993

[30] Foreign Application Priority Data

Oct. 19, 1992 [JP] Japan ..................... 4-306111

[51] Int. Cl.⁶ ............. G11B 25/04; G11B 17/028
[52] U.S. Cl. .................... 369/270; 360/99.12
[58] Field of Search .................. 360/98.08, 99.12; 369/270, 271, 289, 290

[56] References Cited

U.S. PATENT DOCUMENTS

| | | | |
|---|---|---|---|
| 4,150,831 | 4/1979 | Watanabe | 274/15 |
| 4,618,900 | 10/1986 | Saito | 360/97 |
| 4,731,779 | 3/1988 | Mathunaga | 369/270 |
| 4,958,839 | 9/1990 | Guzik et al. | 369/271 |
| 5,014,143 | 5/1991 | Mori et al. | 369/270 |
| 5,228,023 | 7/1993 | Hartog | 369/271 |
| 5,303,098 | 4/1994 | Yamamori et al. | 360/99.12 |

FOREIGN PATENT DOCUMENTS

| | | | |
|---|---|---|---|
| 53-96806 | 8/1978 | Japan . | |
| 58-155585 | 9/1983 | Japan | 369/270 |
| 59-33682 | 2/1984 | Japan | 360/99.12 |
| 60-237672 | 11/1985 | Japan . | |
| 61-28138 | 2/1986 | Japan . | |
| 2128356 | 5/1990 | Japan | 360/99.12 |
| 2235251 | 9/1990 | Japan | 369/270 |
| 3102672 | 4/1991 | Japan | 369/270 |
| 1148878 | 4/1969 | United Kingdom . | |

*Primary Examiner*—John H. Wolff
*Assistant Examiner*—Brian E. Miller
*Attorney, Agent, or Firm*—Sughrue, Mion, Zinn, Macpeak & Seas

[57] ABSTRACT

A disk holding device contains a turn table for holding a disk having a disk center hole in the center thereof on the turn table; a disk mount member disposed on the center portion of the turn table and fitted with the center hole of the disk; an operation member mounted to freely move in a disk loading and unloading direction; an engagement member disposed to freely move in the radial direction of the disk mount member, the engagement member being brought into contact with the disk center hole when the disk is fitted into the disk mount member; urging device for urging the engagement member in the radial direction of the disk mount member; and urging force releasing device for releasing an urging force applied to the engagement device by the urging device in accordance with the movement of the operation member.

7 Claims, 7 Drawing Sheets

DISK HOLD DEVICE HAVING AN OPERATION BUTTON

BACKGROUND OF THE INVENTION

1. Field of the Invention

The present invention relates to a disk hold device which can be applied to a compact disk drive device or the like.

2. Related Art

Conventionally, as an ordinary disk hold device which has been used in a compact disk drive device and the like, for example, there is known a device which clamps a disk by means of a turn table and a disk hold member such as a magnet to thereby hold the disk, as disclosed in Unexamined Japanese Utility Model Publication sho. 61-28138. The disk hold device of this type is mainly applied to a stationary disk drive device designed mainly for house use. However, if the disk hold member is applied, as it is, to a portable disk drive device which must be constructed thin, a thin portable disk drive device cannot be realized due to the disk hold member. Therefore, in order to solve such problem, there has been conventionally proposed a disk hold device in which a plurality of balls are disposed in the center portion of a turn table such that they project out in the radial direction of the turn table and a disk is held on the turn table by means of the projecting urging forces of the balls. Such device is disclosed, for example, in Unexamined Japanese Utility Model Publication sho. 53-96806. Description will be given below concretely of a conventional disk hold device of this type.

In FIGS. 12 and 13, a turn table 81 is rotationally driven by a motor 89. In the center portion of the turn table 81, there is provided a peripheral wall 82 which projects upwardly and is formed integrally with the turn table 81 center portion, and a cap-like ball hold member 83 is fitted with the peripheral wall 82, whereby the ball hold member 83 can be fixed onto the turn table 81. The ball hold member 83 serves as a disk mount part and the outer diameter of the ball hold member 83 is equal or slightly smaller than the diameter of a central hole of a disk 40. The ball hold member 83 includes in the inside thereof three groove-like ball guides 88 which are disposed at equal intervals with respect to the peripheral direction thereof and extend in the radial direction thereof. In each of the ball guides 88, there is disposed a ball 84 which can be moved along the ball guide 88. Also, each ball guide 88 has an opening which is open to the outer peripheral surface of the ball hold member 83 and each ball 84 is forced toward outwardly in the radial direction thereof by a coil spring 85 which is disposed within the ball guide 88. Each ball guide 88 also has two side walls 86 in the vicinity of the opening and the two side walls 86 are projected inward in the radial direction to thereby prevent each ball 84 form slipping off. Each of the balls 84 is urged outward in the radial direction thereof by the coil spring 85 so that part of the ball 84 is projected out from the opening of the ball hold member 83. Between the projection position of the ball 84 and the disk carry surface of the turn table 81, there is secured a proper dimension which is calculated on the basis of the thickness dimension of the disk 40, so that the ball 84 forms an engagement member for engaging the disk 40.

To load the disk 40 onto the turn table 81, as shown by a one-dot chained line right in FIG. 13, the central hole of the disk 40 is fitted with the outer periphery of the ball hold member 83 and is then put onto the respective balls 84, the disk 40 is pressed by fingers, and while the balls 84 are being retreated inwardly in the radial direction against the urging force of the spring 85, the disk 40 is put on the turn table 81.

If the disk 40 is put on the turn table 81, then part of the ball 84 is projected out from the opening of the ball hold member 83 by the urging force of the spring 85, the upper edge portion of the central hole of the disk 40 is pushed by the urging force given to the ball 84 and thus the disk 40 is pressed onto the turn table 81, so that the disk 40 can be rotated integrally with the turn table 81.

On the other hand, to remove the disk 40 from the turn table 81, as shown left in FIG. 13, one finger is put onto the ball hold member 83, another finger is applied to the outer periphery of the disk 40 shown by a two-dot chained line, and then the outer peripheral portion of the disk 40 is lifted up forcibly. By doing so, the edge portion of the central hole of the disk 40 retreats the ball 84 inwardly in the radial direction against the urging force given by the spring 85, so that the disk 40 can be removed from the ball hold member 83.

Also, as a second example of the conventional disk hold device, there is also known a device which is disclosed in Unexamined Japanese Patent Publication sho 60-237672. The second conventional disk hold device is shown in FIGS. 14 and 15. The device includes a turn-table 90 which can be rotatively driven by a motor 92 and a plurality of elastic pieces 91 which respectively extend from the center portion of the turn table 90 and projects upwardly. The elastic pieces 91 are arranged along a circumference which is substantially equal in diameter to the center hole of the disk 40 and each of the elastic pieces 91 is normally, or in its natural state, projected in part outwardly in the diameter direction. And, as shown in FIG. 15, if the upper ends of the respective elastic pieces 91 are pressed simultaneously, then the elastic pieces 91 are flexed inwardly against the elastic forces thereof.

In the conventional disk hold device shown in FIGS. 14 and 15, to load the disk 40, the center hole of the disk 40 is fitted with the upper portion of the respective elastic pieces 91 and then the disk 40 is pressed down with a finger. The upper inclined surfaces of the respective elastic pieces 91 are pressed against the edge portion of the center hole of the disk 40 and thus the elastic pieces 91 are flexed inwardly in the diameter direction, so that the disk 40 is put onto the turn table 90. If the disk 40 is put on the table 90, then the elastic pieces 91 respectively spread toward their original positions due to their own elastic forces and the returning forces of the elastic pieces 91 cause the projected portions of the middle portions of the elastic pieces 91 to press against the upper edge portions of the center hole of the disk 40, so that the disk 40 is pressed onto the turn table 90 and thus the disk 40 can be rotationally driven together with the turn table 90. On the other hand, to remove the disk 40 from the turn table 90, as shown in FIG. 15, the upper ends of the respective elastic pieces 91 are pressed simultaneously with fingers to thereby flex the respective elastic pieces 91 inwardly in the diameter direction and then the disk 40 may be lifted up.

As shown in FIGS. 12 and 13, according to the conventional disk hold device, due to the fact that the disk is loaded and unloaded forcibly against the urging forces of the balls, that is, the disk cannot be loaded and unloaded lightly, there are found the following inconveniences: there is a possibility that the disk cannot be loaded firmly; the recording surface of the disk may be clamped with fingers and may be stained; and, the disk may be damaged. These inconveniences depreciate the commercial value of the disk hold device.

Also, in the conventional disk hold device as shown in FIGS. 14 and 15, because the disk is loaded forcibly against the elastic forces of the elastic pieces, there are found defects which are similar to those found in the conventional disk hold device shown in FIGS. 12 and 13.

SUMMARY OF THE INVENTION

In view of the forgoing problem, it is an object of the invention to provide a disk hold device which can load and unload a disk lightly to thereby provide a very high operationability in loading and unloading the disk, can eliminate the need to clamp the recording surface of the disk with fingers to thereby prevent the disk from being stained, can load the disk firmly, and can eliminate the danger to damage the disk.

According to one aspect of the present invention, there is provided a disk holding device comprising a turn table for holding a disk having a disk center hole in the center thereof on the turn table; a disk mount member disposed on the center portion of the turn table and fitted with the center hole of the disk; an operation member mounted to freely move in a disk loading and unloading direction; an engagement member disposed to freely move in the radial direction of the disk mount member, the engagement member being brought into contact with the disk center hole when the disk is fitted into the disk mount member; urging means for urging the engagement member in the radial direction of the disk mount member; and urging force releasing means for releasing an urging force applied to the engagement means by the urging means in accordance with the movement of the operation member.

According to another aspect of the present invention, there is provided a disk holding device comprising a disk having a center hole defined in the center of the disk; a turn table for holding the disk on thereon, the turn table having a shaft hole into which a rotary shaft of a motor is fixedly secured; a lever disposed on the turn table, a lever being formed in an arc shape, the lever having an end portion defined in the vicinity of one end thereof, the end portion being supported in such a manner that the end portion is rotated in a plane parallel to a surface of the turn table, the lever having a projection in the middle portion thereof; urging means for urging the lever to project the lever in the radial direction of the turn table; an engaging member integrally formed with the other end of the lever which is brought into contact with the center hole when the disk is loaded; an operation member having an inclined surface which is brought into contact with the projection formed in the lever, the operation member being freely movable in a disk loading and unloading direction; and a disk mount member for surrounding the lever and holding an outer peripheral portion of the operation member.

According to another aspect of the present invention, there is provided a disk holding device comprising a disk having a center hole defined in the center thereof; a turn table having a shaft hole into which a rotary shaft of a motor is fixedly fitted and the cylindrical wall projecting in a disk loading and unloading direction; an operation member moving freely in the disk loading and unloading direction, the operation member having a guide portion which is fitted on an outer peripheral surface of the shaft hole; an auxiliary board disposed between the turn table and the operation member, the auxiliary board having a projecting portion in the radial direction thereof; a compression spring interposed between the projecting portion and the turn table, the compression spring urging the axially board and bring into contact with the operation member so as to urge the operation member; a disk mount member fixedly secured on the wall so as to hold the cylindrical wall of the operation member; and an engagement member held within the disk mount member, the engagement member being brought into contact with the center hole when the disk is loaded.

According to the invention, at the first position of the operation member, the engagement member is forced to thereby secure the disk, while, at the second position of the operation member obtained after the operation member is operated against the urging force applied thereto, the urging force applied to the operation member is removed or reduced. Thanks to this, with the operation member set at the second position, the disk can be loaded and unloaded, the loading and unloading of the disk can be achieved very smoothly with high operationability, and there can be eliminated the problems, which are found in the conventional devices in which the disk is forcibly loaded and unloaded, that the disk may be stained or damaged, so that the commercial value of the disk hold device can be improved.

DETAILED DESCRIPTION OF THE PREFERRED EMBODIMENTS

Description will be given below of a first embodiment of a disk hold device according to the invention with reference to the accompanying drawings.

Figure 1:
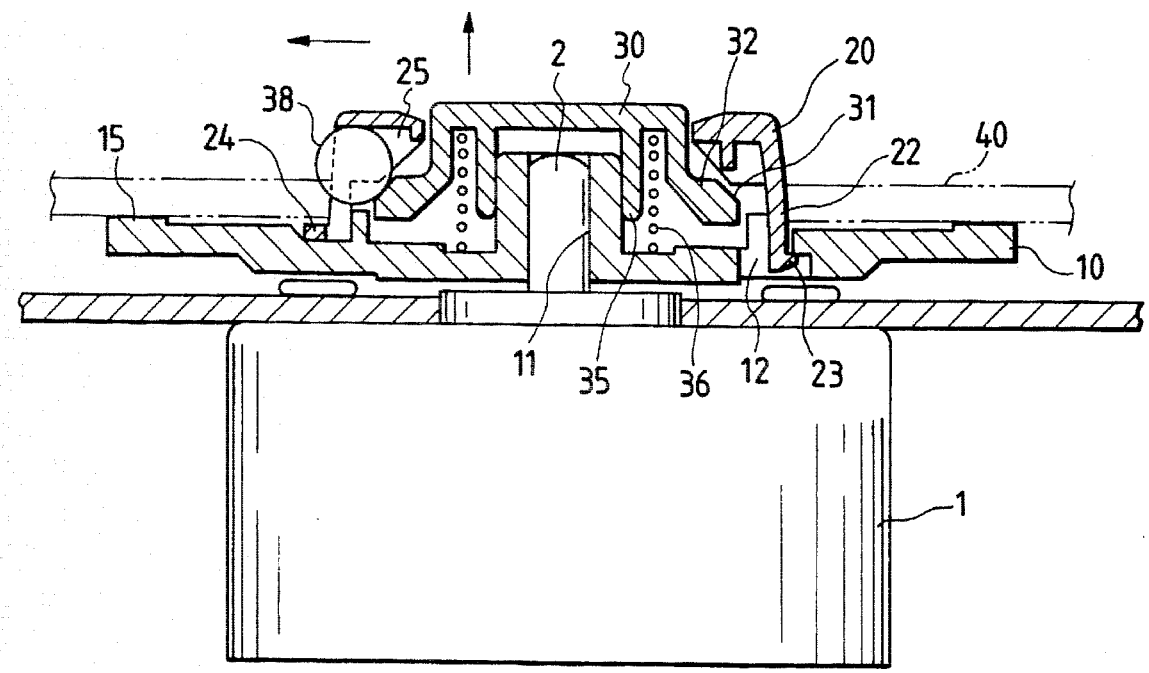
FIG. 1 is a front sectional view of a first embodiment of a disk hold device according to the invention.
Figure 2:
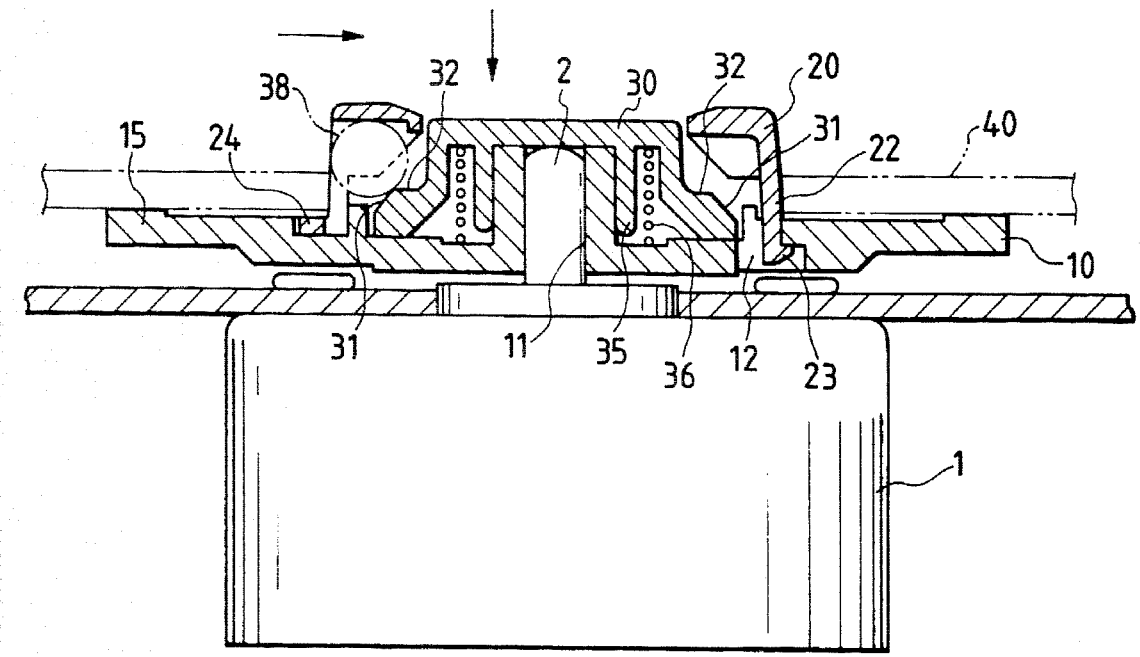
FIG. 2 is a front sectional view of a modification of the first embodiment.
Figure 3:
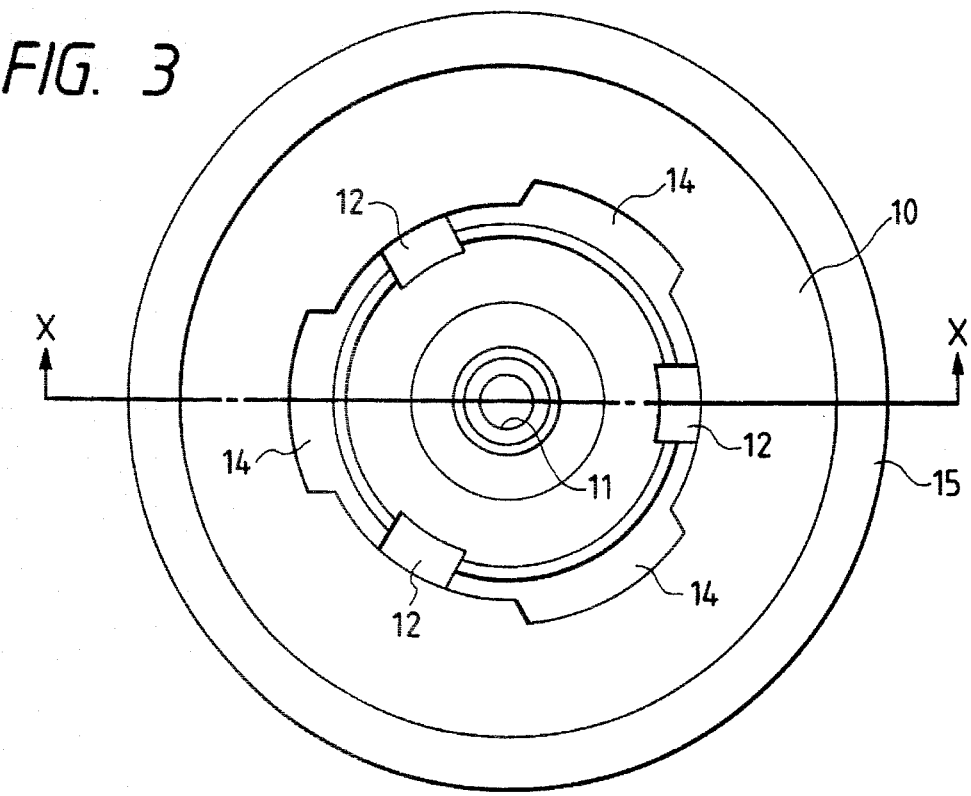
FIG. 3 is a plan view of a turn table employed in the first embodiment.
Figure 4:
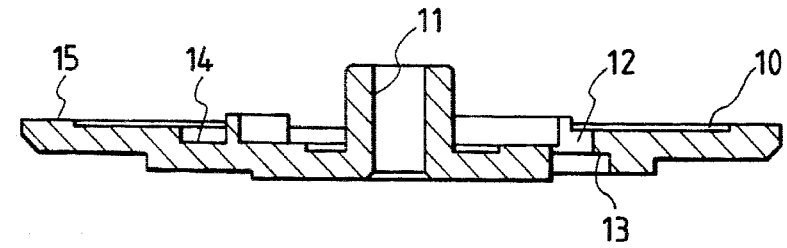
FIG. 4 is a front sectional view of the above turn table taken along the line X—X in FIG. 3.

In FIGS. 1 and 2, there is provided a motor 1 which is used to rotationally drive a disk. The motor 1 includes a rotary shaft 2 which projects from the motor 1. A shaft hole 11, which is formed in a boss portion of a turn table 10, is fitted with and fixed to the outer periphery of the rotary shaft 2. The turn table 10, as shown in FIGS. 3 and 4, is formed in a disk-like shape as a whole and includes a disk carry surface 15 which is disposed in the outer periphery thereof and projects upwardly.

Also, the turn table 10 includes three window holes 12, which are respectively formed in the vicinity of the middle portion in the radial direction thereof and along the peripheral direction thereof, and three stepped portions 13 which are provided on the lower surface side thereof and each of which is formed integrally with the window hole 12. The turn table 10 further includes three partially arc-shaped recessed portions 14 which are respectively interposed between the window holes 12.

A cylindrical guide portion 35, which is formed integrally with a cap-like operation button 30, is loosely fitted with the outer peripheral side of the boss portion of the turn table 10 shown in FIGS. 1 and 2.

The operation button 30 is mounted such that it can be moved along the boss portion in the loading and removing direction (in the vertical direction) of the disk 40. The operation button 30 serves as both an operation member and urging force releasing means in the present invention.

Also, a coil spring 36 serving as an elastic member is fitted with the outer peripheral side of the cylindrical guide portion 35 and the two ends of the coil spring 36 are respectively abutted against the upper surface of the turn table 10 and the ceiling surface of the operation button 30, so that the operation button 30 is urged upwardly in FIGS. 1 and 2.

The outer peripheral edge portion of the operation button 30 on the open end side thereof, that is, on the lower end side thereof in FIGS. 1 and 2 provide a flange 33 which serves as the urging force releasing means, and the flange includes an inclined surface 31 in the upper edge portion thereof in the vicinity of the outer peripheral portion thereof so that the upper edge portion of the flange provides a tapered shape.

Also, adjoining the inclined surface 31 of the flange, there is formed another surface 32 which has a different angle of inclination from that of the inclined surface 31 with respect to the moving direction of the operation button 30. The upper surface of the operation button 30, in the illustrated first embodiment, provides a flat surface. However, in view of the operationability thereof, it may include gentle cavity.

The operation button 30 includes on the outer peripheral side thereof a ball hold member 20 which forms a disk mount part in the present invention.

Figure 5:
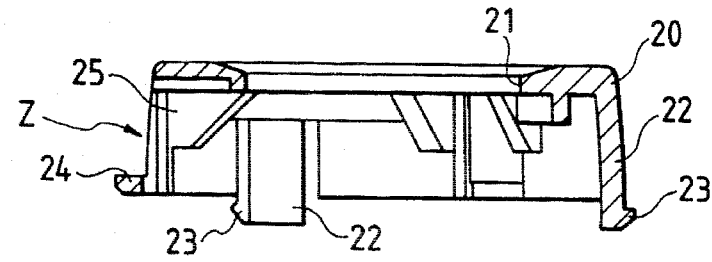
FIG. 5 is a front sectional view of a ball hold member employed in the first embodiment taken along the line Y—Y in FIG. 6.
Figure 6:
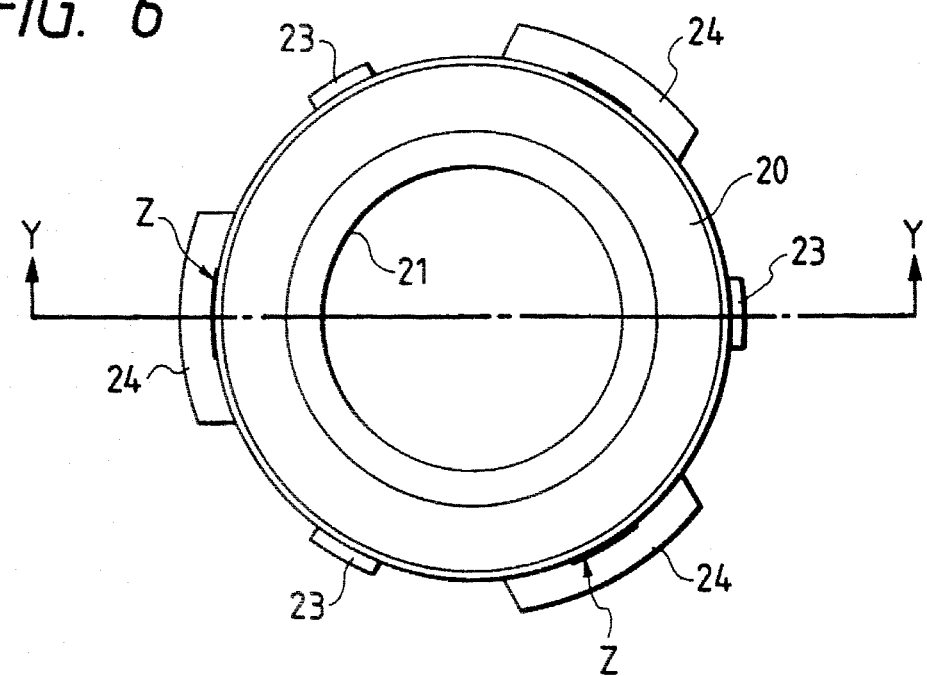
FIG. 6 is a plan view of the above ball hold member.
Figure 7:
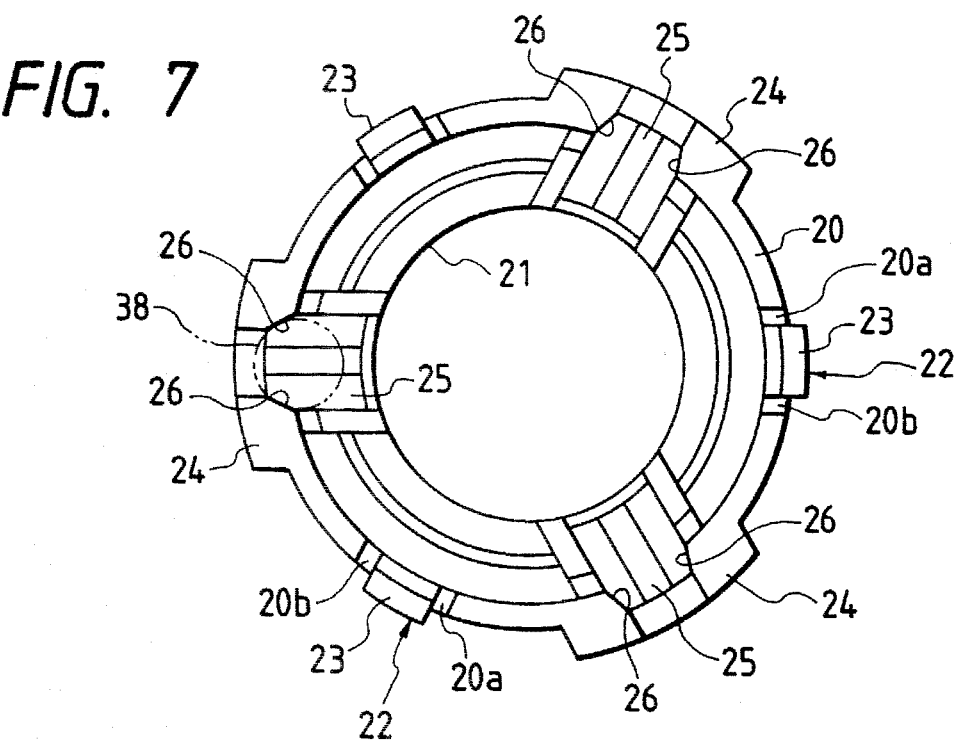
FIG. 7 is a bottom view of the above ball hold member.

The ball hold member 20, as shown in FIGS. 5 to 7, includes, in the top portion of an inverted cup-like portion thereof, a circular central hole 21 which serves as an escape from the operation button 30. Part of the peripheral wall of the ball hold member 20 serving as a disk mount surface includes three elastic arms 22, which are respectively separated from other portions by two grooves 20a and 20b respectively formed along the axial direction thereof and project out from the open end of the ball hold member 20. The elastic arm 22 includes in the tip end portion thereof a hook portion 23 which projects outwardly and is engageable with a stepped portion 13 formed in the turn table 10.

The ball hold member 20 includes in the open end thereof three projections 24 which respectively project outwardly in the circumferential direction thereof and are to be put in recesses 14 respectively formed in the turn table 10. Within the ball hold member 20, as shown in FIG. 7, three ball guides are provided in such a manner that they extend in the diameter direction of the ball hold member 20, respectively.

Within each of the ball guides 25, there is disposed a ball 38 serving as a disk engagement member in such a manner that the ball 38 can be moved in the diameter direction of the ball hold member 20 while it is guided by the ball guide 25. Although the ball guides 25 are respectively connected to an opening portion Z formed in the peripheral wall of the ball hold member 25, two side walls 26 formed in the vicinity of the opening portion Z of each of the ball guides 25 are narrower than the diameter of the ball 38, which prevents the ball 38 from flying out in the diameter direction of the ball hold member 20. On the other hand, part of the ball 38 projects out from the opening portion Z to thereby be able to engage the disk.

Referring again to FIGS. 1 and 2, the ball hold member 20 is disposed on the turn table 10 so as to surround the operation button 30 from the outer periphery thereof, and the projections 24 of the ball hold member 20 are fitted into the recesses 14 of the turn table 10. In this operation, the elastic arm 22 of the ball hold member 20 is inserted into the window hole 12 of the turn table 10 while it is flexed inwardly, and the hook portion 23 in the tip end portion of the elastic arm 22 is hitched on the stepped portion 13 of the turn table 10, whereby the ball hold member 20 is fixed onto the turn table 10. By mounting the ball hold member 20 in this manner, the balls 38 are respectively interposed between the ball guides 25 of the ball hold member 20 and the inclined surface 31 of the operation button 30.

The position of the ball 38 shown by a solid line in FIG. 1 illustrates a state before the disk assembled in the above-mentioned manner is mounted. The operation button 30 is forced upwardly by the spring 36, the urging force causes the inclined surface 31 of the operation button 30 to push the ball outwardly in the diameter direction of the ball hold member 20, the movement of the ball 38 is restricted by the two side walls 26 of the opening portion Z of the ball hold member 20, and part of the ball 38 is projected out from the opening portion Z of the ball hold member 20 in such a manner that it can be engaged with the disk. The position of the operation button 30 in this state is expressed as a first position. In the first position, the disk 40 can be engaged by part of the ball 38 projected out from the opening portion Z of the ball hold member 20.

FIG. 2 shows a state in which the operation button 30 is pressed down against the urging force of the spring 36. If the operation button 30 is pressed down, then the inclined surface 31 of the operation button 30 is moved downwardly, which allows the ball 38 to move toward the surface 32 adjoining the inclined surface 31, so that the urging force of the spring 36 applied through the inclined surface 31 to the ball 38 is removed or reduced.

The position of the operation button 30, which is obtained when the urging force applied to the ball 38 is removed or reduced by pressing down the operation button 30 against the urging force of the spring 36, is expressed as a second position. If the length of the flat surface 32 in the diameter direction is previously set smaller than the diameter of the ball 38, then the ball 38 can be surely returned to the position of the inclined surface 31 when the depressing of the operation button 30 is removed.

When the disk 40 is loaded onto the turn table 10, the operation button 30 is situated at the first position shown in FIG. 1, the center hole of the disk 40 is fitted with the outer periphery of the ball hold member 20 and the edge portion of the center hole of the disk 40 is placed on the respective balls 38. In this state, the operative button 30 is pressed down with a finger so that it is moved to the second position shown in FIG. 2. In the second position, as described above, due to the fact that the urging force applied to the ball 38 is removed or reduced, the disk 40 falls down due to its own weight, moves the galls back into the ball hold member 20, and is then placed onto the turn table 10.

Next, if the finger is released from the operation button 30, then the operation button 30 returns to the first position shown in FIG. 1 due to the spring 36, the urging force is again applied to the ball 38 by means of the inclined surface 31. As a result of this, part of the ball 38 is projected out from the outer peripheral surface of the ball hold member 20 to press against the upper edge portion of the center hole of the disk 40, so that the disk 40 is pushed onto the disk carry surface 15 of the turn table 10 and is engaged and held there. In this state, if the motor 1 is rotationally driven, then the disk 40 is rotationally driven integrally with the turn table 10, so that information signals can be recorded and reproduced.

To unload the mounted disk 40, while the operation button 30 is being pressed down with a finger against the urging force of the spring 36, the outer peripheral portion of the disk 40 is lifted up with another finger. If the operation button 30 is set at the second position by pushing the operation button 30, then the urging force applied to the ball 38 is removed or reduced and, for this reason, the disk 40 can be removed from the turn table 10 with substantially no resistance.

According to the first embodiment described heretofore, due to the fact that at the first position of the operation button 30 the ball 38 is forced to thereby secure the disk 40 while, at the second position thereof obtained by operating the operation button 30 against the urging force, the urging force applied to the ball 38 is removed or reduced, the disk 40 can be loaded and unloaded with the operation button 30 set at the second position thereof, which means that the loading and unloading of the disk 40 can be achieved very smoothly with high operationability. Therefore, the first embodiment is different from the conventional disk hold device in which the disk is forcibly loaded and unloaded. That is, according to the first embodiment, there is eliminated the possibility that the disk 40 can be strained and the disk 40 can be damaged, thereby being able to improve the commercial value thereof. Also, due to the fact that the operation button 30 can be forced by a single coil spring 36, the urging force is transmitted to the three balls 38 by means of the inclined surface 31 of the operation button 30 and is transformed into the moving force going in the outer peripheral direction, the pressing forces of the three balls 38 can be made uniform to thereby stabilize the holding of the disk 40. Further, the first embodiment is advantageous in that such disk hold device can be realized with the reduced number of parts.

Now, to make thin a disk drive device, it is desirable to reduce the moving stroke of the operation button 30 as much as possible. In the condition that the moving stroke of the operation button 30 is reduced, in order to secure the moving stroke of the ball stroke 38 to a certain or greater extent, generally, it is necessary to increase the inclination angle of the operation button 30 with respect to the moving direction of the operation button 30, that is, in FIG. 1, the inclination angle may be decreased. However, this reduces the engagement force of the disk 40 by the balls 38.

According to the above-mentioned first embodiment, however, due to the fact that, at the first position of the operation button 30, the ball 38 is pushed by the inclined surface 31 and is thus forced, whereas, at the second position of the operation button 30, the ball 38 can be escaped toward the surface 32 which adjoins the inclined surface 31 and has a different inclined angle from that of the inclined surface 31 with respect to the moving direction of the operation button 30, even if the moving stroke of the operation button 30 is short, the moving distance of the ball 38 can be secured to such a sufficient degree to allow the ball 38 to escape from the disk 40 and, even if the inclined angle of the inclined surface 31 is enlarged to increase the urging force of the ball 38, there can be secured a sufficiently long distance to allow the ball 38 to escape in the radial direction.

Second Embodiment

Figure 8:
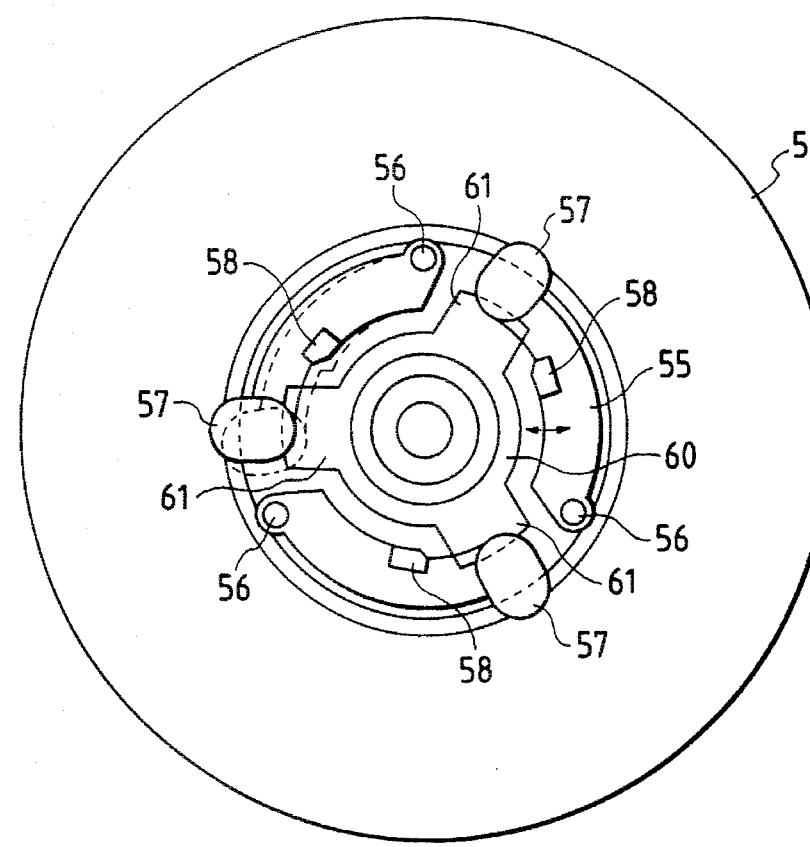
FIG. 8 is a plan view of a turn table employed in a second embodiment of a disk hold device according to the invention.
Figure 9:
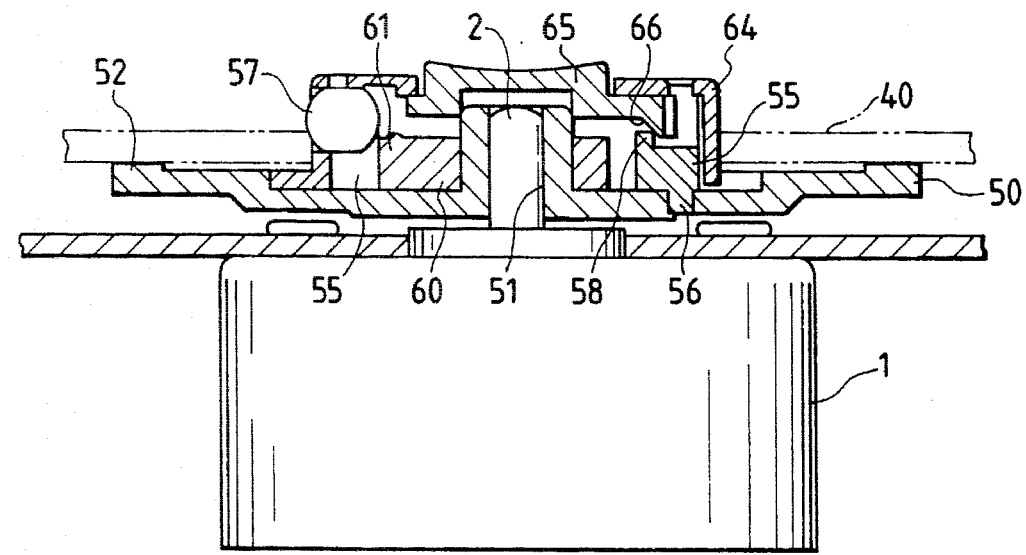
FIG. 9 is a front sectional view of a second embodiment of a disk hold device according to the invention.

Next, description will be given below of a second embodiment of a disk hold device according to the invention. In FIGS. 8 and 9, a shaft hole 51 formed in the boss portion of a turn table 50 is fitted with and fixed to a rotary shaft 2 of a motor 1 and, on the turn table 50, there is provided an elastic member 60 which is formed of rubber, resin or the like and serves as urging means in the present invention.

The elastic member 60 projects outwardly and includes three projections 61 which respectively extend along the peripheral direction thereof and are used to project and force levers 55 outwardly which will be described later. On the turn table 50, there are provided three levers 55 which are respectively formed in an arc shape on the outer peripheral side of the elastic member 60. The three levers 55 are supported in such a manner that, if three shafts 56 each formed in the vicinity of one end of each lever 55 are respectively fitted into the shaft holes of the turn table 50, then the levers 55 can be rotated in a plane parallel to the surface of the turn table 50. Each of the levers 55 includes in the other end thereof a spherical member 57 which is formed integrally with the lever and serves as an engagement member in the present invention, and also includes a projection 58 in the longitudinally middle portion thereof. The other end of each lever 55 is disposed to face each projection 61 of the elastic member 60.

Above the elastic member 60 and the respective levers 55, there is disposed an operation button 65, which serves as an operation member in the present invention, in such a manner that it is movable in the disk loading and unloading directions (in the drawings, upward and downward directions). The operation button 65 includes an inclined surface 66 which can be abutted against the projections 58 of the respective levers from above. The projections 58 and inclined surface 66 serves as urging force removing means in the present invention. On the top surface of the turn table 50, there is fixed a cover 64 which surrounds the respective levers 55, holds the outer peripheral portion of the operation button 65, and serves as a disk mount part in the present invention.

Since the respective levers 55 are disposed within the cover 64 in such a manner that they compress the projections 61 of the elastic member 60, the other ends of the respective levers 55 are forced to move in the outer peripheral direction of the turn table 50, that is, as shown in FIG. 8, the other ends of the levers 55 are urged so that they are respectively rotated about the shafts 56 of the levers 55 outwardly in the diameter direction thereof, namely, in a clockwise direction, with the result that part of the spherical member 57 is projected out from the opening of the cover 64. Also, in this state, the projections 58 of the respective levers 55 push the inclined surface 66 of the operation button 65 outwardly in the radial direction thereof and, therefore, the operation button 65 is pushed up by the component force thereof. This state is shown in FIG. 9 and the position of the operation button 65 shown in FIG. 9 is the first position thereof.

In FIG. 9, if the operation button 65 is pressed down, then the inclined surface 66 of the operation button 65 pushes the projections 58 of the respective levers 55, so that the respective lever 55 are rotated counterclockwise about the shafts 56 in FIG. 8 against the elastic force of the elastic member 60 to thereby retreat the spherical members 57 from the opening of the cover 64. The position in which the operation button 65 is pushed down is the second position of the operation button 65. In the second position, the urging forces applied to the spherical members 57, which secure the disk 40 to be loaded and unloaded, are removed or reduced. As described above, in the second embodiment as well, similarly as in the previously described first embodiment, since the operation button 65 can be located at the first and second positions, there can be provided similar operation effects to those of the first embodiment.

Third Embodiment

Figure 10:
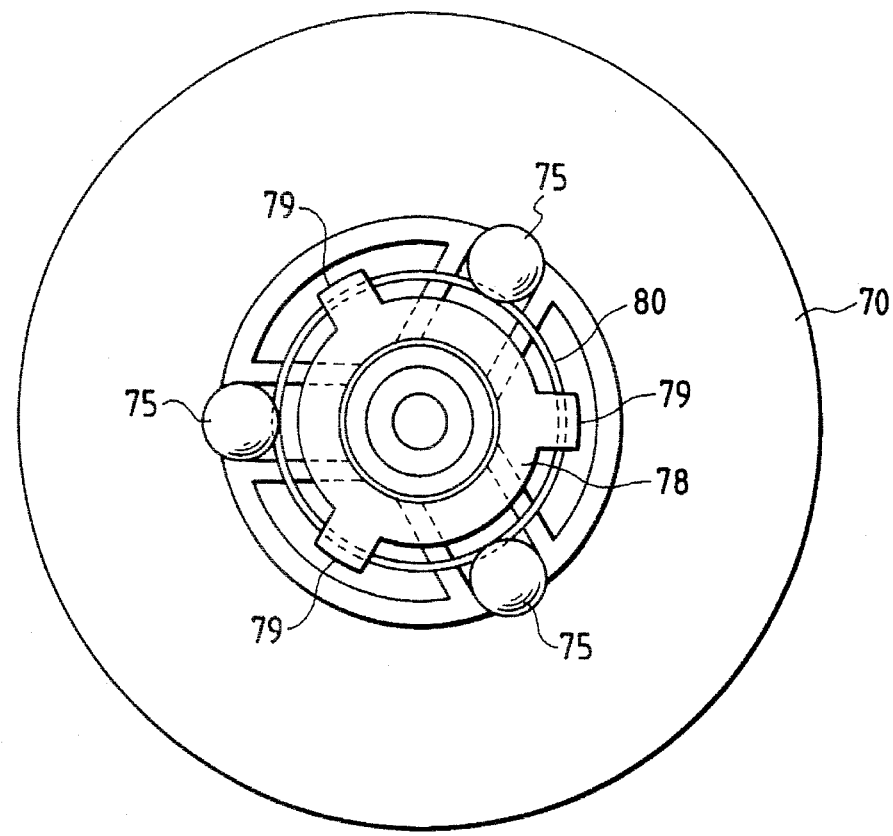
FIG. 10 is a plan view of a turn table employed in a third embodiment of a disk hold device according to the invention.
Figure 11:
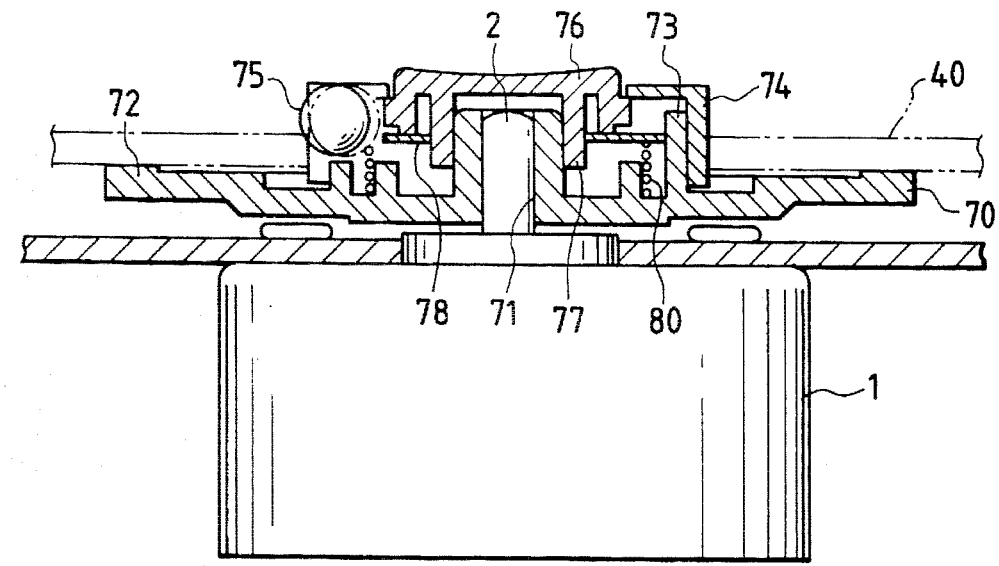
FIG. 11 is a front sectional view of a third embodiment of a disk hold device according to the invention.
Figure 12:
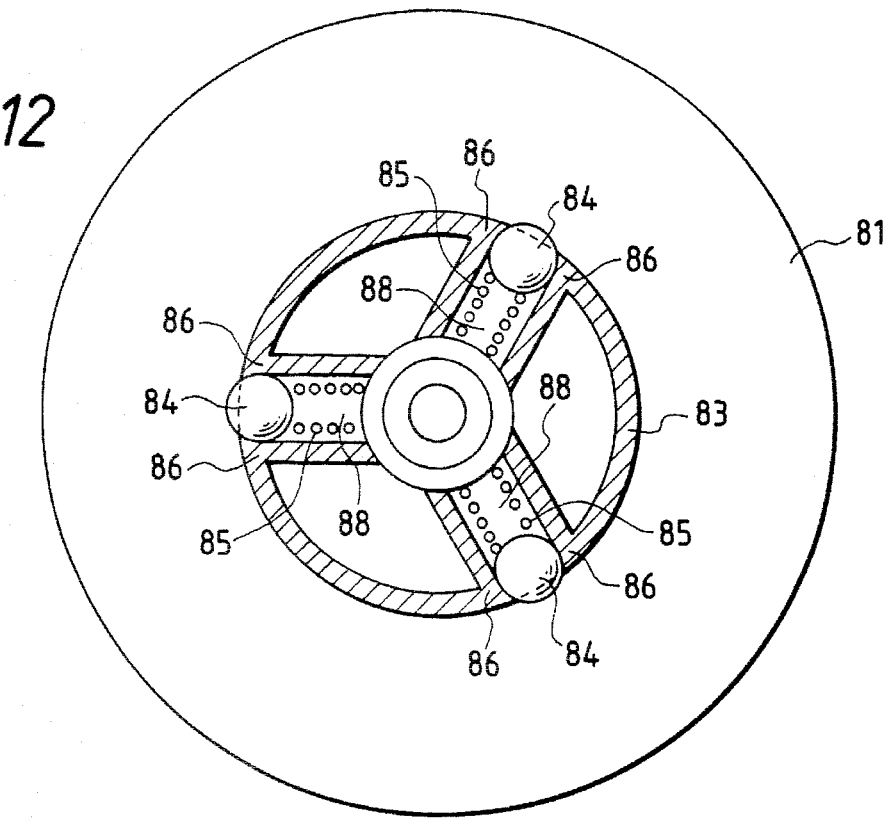
FIG. 12 is a partially sectional plan view of main portions of a conventional disk hold device.
Figure 14:
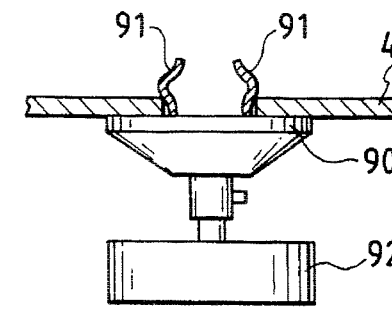
FIG. 14 is a front section view of another conventional disk hold device.
Figure 15:
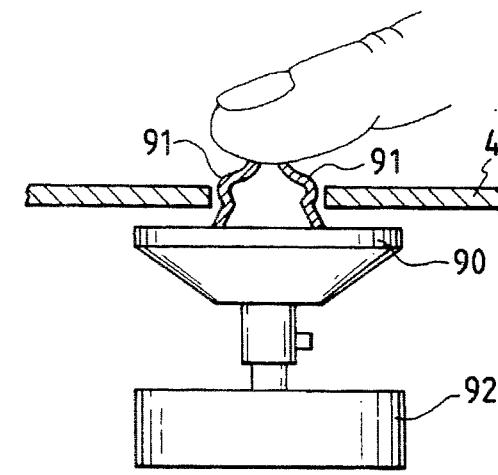
FIG. 15 is a front section view of the latter conventional disk hold device, showing a state in which the device is used.
Figure 13:
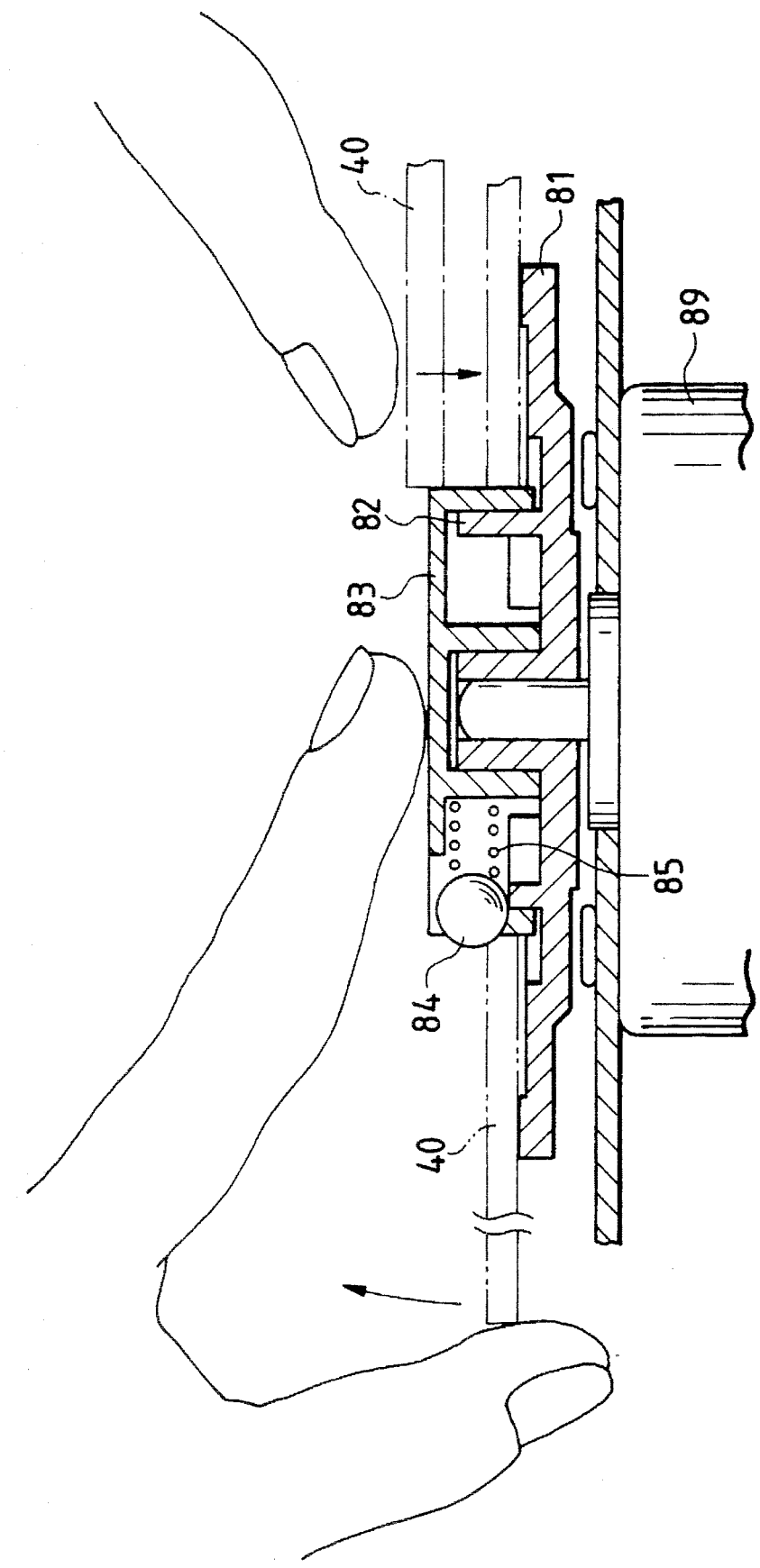
FIG. 13 is a front section view of the conventional disk hold device, showing a manner in which a disk is loaded and unloaded.

Next, description will be given below of a third embodiment of a disk hold device according to the invention, which is shown in FIGS. 10 and 11. In FIGS. 10 and 11, there is provided a motor 1 which has a rotary shaft 2. A turn table 70 includes a shaft hole 71 in the boss portion thereof. The shaft hole 71 is fitted with and fixed to the rotary shaft 2 of the motor 1. An operation button 76 serving as an operation member and including a cylindrical guide portion 77 is disposed on the turn table 70 in such a manner that, it the cylindrical guide portion 77 is fitted with the boss portion of the turn table 70, then the operation button 76 can be moved in the disk loading and unloading direction (in FIGS. 10 and 11, in the upward and downward direction). Between the turn table 70 and the operation button 76, there is interposed a substantially disk-shaped auxiliary board having three projections 79 which respectively project radially. And, between the projections of the auxiliary board 78 and the turn table 70, there is interposed a compression coil spring 80 which serves as urging means in the present invention.

Therefore, the coil spring 80 forces the auxiliary board 78 through the projections 79 and thus the auxiliary board 78 is abutted against the lower surface of the operation button 76 to thereby urge the operation button 76 upwardly.

Also, the turn table 70 includes a cylindrical wall 73 which is located further outside of the coil spring 80. A cover 74 serving as a disk mount part is fitted with and fixed to the wall 73 and holds the outer peripheral edge portion of the operation button 76. Within the cover 74, three balls 75 serving as engagement members are held by proper guides similarly as in the previously described first embodiment. As shown in FIG. 10, the coil spring 80 is in contact with the respective balls 75 and projects and forces the balls 75 by pressing against the inclined surfaces of the balls 75.

In a state in which the disk is not loaded, the operation button 76 is pushed up due to the elastic force of the coil spring 80 through the auxiliary board 78 and the respective balls 75 are urged in the outer peripheral direction by the upper end portion of the coil spring 80, so that part of the respective balls 75 are projected from the outer periphery of the cover 74 to take disk 40 engaging positions. This position of the operation button 76 is the first position. If the operation button 76, which is pushed up by the urging force of the coil spring 80 through the auxiliary board 78, is pressed down against the urging force of the coil spring 80, then the upper end portion of the spring 80 is caused to escape from the balls 75, so that the urging forces applied to the balls 75 are removed or reduced. This position of the operation button 76 is the second position. As described above, in the third embodiment as well, similar to the previously described first embodiment, because the operation button 76 can be set at the first and second positions, there can be provided similar operation effects to those of the first embodiment.

As has been described heretofore, according to the invention, at the first position of the operation member, the engagement member is forced to thereby secure the disk, while, at the second position of the operation member obtained after the operation member is operated against the urging force applied thereto, the urging force applied to the operation member is removed or reduced. Thanks to this, with the operation member set as the second position, the disk can be loaded and unloaded, the loading and unloading of the disk can be achieved very smoothly with high operationability, and there can be eliminated the problems, which are found in the conventional devices in which the disk is forcibly loaded and unloaded, that the disk may be stained or damaged, so that the commercial value of the disk hold device can be improved.

What is claimed is:

1. A disk holding device comprising:

a turn table for holding a disk having a disk center hole in a center thereof on said turn table;

an operation member mounted on the turn table to freely move relative to said turn table between a load position and an unload position;

a cap-shaped disk mount member including an opening end portion engaging the turn table and a bottom portion having a circular shaped hole surrounding the operation member, said center hole of said disk fitted with an outer peripheral surface of the disk mount member;

an engagement member disposed in the disk mount member to freely move in a radial direction of said disk mount member, said engagement member being brought into contact with said disk center hole when said disk is fitted with the outer peripheral surface of said disk mount member;

urging means for urging said engagement member to said disk center hole, whereby said disk is secured to said turn table when said operation member is in said load position; and urging force releasing and reducing means for releasing and reducing an urging force provided to said engagement member by said urging means to facilitate loading and unloading of said disk to and from said turn table, wherein said urging force releasing and reducing means releases and reduces said urging force when said operation member is in said unload position.

2. A disk holding device as claimed in claim 1, wherein said urging means provides urging force to said engagement member through said operation member.

3. A disk holding device as claimed in claim 1, wherein said operation member and said urging force releasing and reducing means are formed integrally with each other.

4. A disk holding device as claimed in claim 1, wherein said urging force releasing and reducing means includes a flange in which a tapered inclined surface is formed.

5. A disk holding device as claimed in claim 4, wherein said flange includes a second surface for allowing the engagement member to move in a radial direction, said second surface extending in said radial direction and having an inclination angle different from an inclination angle of said tapered inclined surface with respect to said moving direction of said operation member.

6. A disk holding device as claimed in claim 1, wherein said turn table is formed in a disk shape, and includes:

a shaft hole for fittingly securing a rotary shaft;

wherein said turn table contains a disk carry surface which is defined in an outer peripheral portion of said turn table, a plurality of window holes respectively defined in said turn table along a circumferential direction thereof in a radial direction thereof, a plurality of stepped portions defined on an opposite side to said disk carry surface and formed integrally with said window holes, and a plurality of partially arc-shaped recesses defined between said window holes.

7. A disk holding device as claimed in claim 1, wherein said disk mount member is formed in a cup-like shape with a circular center hole, said disk mount member includes:

a peripheral wall corresponding to a disk mount surface, one portion of said peripheral wall being separated from other portions of said disk mount member by two grooves defined along an axis direction of said disk mount member;

a plurality of elastic arms projecting from said opening end portion of said disk mount member;

hook members formed on a distal end of said elastic arm to engage with said turn table; and a plurality of projections provided in said opening end portion of said disk mount member, said projections projecting outwardly in said peripheral direction of said disk mount member for mounting said disk mount member to said turntable.

* * * * *